United States Patent
Aoki

(10) Patent No.: US 9,299,153 B2
(45) Date of Patent: Mar. 29, 2016

(54) CALIBRATION APPARATUS, A DISTANCE MEASUREMENT SYSTEM, A CALIBRATION METHOD AND A CALIBRATION PROGRAM

(75) Inventor: Shin Aoki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 731 days.

(21) Appl. No.: 13/509,328

(22) PCT Filed: Aug. 25, 2011

(86) PCT No.: PCT/JP2011/069854
§ 371 (c)(1),
(2), (4) Date: May 11, 2012

(87) PCT Pub. No.: WO2012/035983
PCT Pub. Date: Mar. 22, 2012

(65) Prior Publication Data
US 2012/0224069 A1 Sep. 6, 2012

(30) Foreign Application Priority Data

Sep. 13, 2010 (JP) .................................. 2010-204328

(51) Int. Cl.
*G06T 7/00* (2006.01)
*G01B 11/02* (2006.01)
(Continued)

(52) U.S. Cl.
CPC ............ *G06T 7/0075* (2013.01); *G01B 11/026* (2013.01); *G01C 3/085* (2013.01);
(Continued)

(58) Field of Classification Search
USPC ....... 382/154, 300; 429/432; 600/515; 707/2, 707/100; 708/290; 348/54, 208.97; 345/424
See application file for complete search history.

(56) References Cited

U.S. PATENT DOCUMENTS 5,418,899 A   5/1995 Aoki
5,655,540 A * 8/1997 Seegobin ...................... 600/515
(Continued)

FOREIGN PATENT DOCUMENTS

JP         9 133525       5/1997
JP       2001 160137      6/2001
(Continued)

OTHER PUBLICATIONS

Hernandez, P.A., Graham, C.H., Master, L.L., Albert, D.L., Oct. 24, 2006. "The effect of sample size and species characteristics on performance of different species distribution modeling methods" Ecography vol. 29, 773-785.*

(Continued)

*Primary Examiner* — Jorge L Ortiz Criado
*Assistant Examiner* — Daniel Chang
(74) *Attorney, Agent, or Firm* — Oblon, McClelland, Maier & Neustadt, L.L.P

(57) ABSTRACT

A calibration apparatus is provided. The calibration apparatus receives inputs of two reference images and plural items of parallax data; searches for plural feature points common to these two reference images; calculates parallaxes and parallax changing amounts, based on the parallax data related to the respective feature points in these two reference images, for each of the searched feature points; and calculates a correction value for the parameter based on the calculated parallaxes and parallax changing amounts. The two reference images are captured by one of the imaging devices at two locations, and the parallax data is calculated using these two reference images and two corresponding images based on positions of plural feature points common to the reference image and the corresponding image for each pair on a location basis. The two corresponding images are captured by another of the imaging devices at these two locations.

15 Claims, 11 Drawing Sheets

(51) Int. Cl.
*G01C 3/08* (2006.01)
*H04N 17/00* (2006.01)
*G08G 1/16* (2006.01)

(52) U.S. Cl.
CPC ...... *G06T 7/002* (2013.01); *G06T 2207/10021* (2013.01); *G06T 2207/30252* (2013.01); *G08G 1/16* (2013.01); *H04N 17/002* (2013.01)

(56) References Cited

U.S. PATENT DOCUMENTS

| | | | |
|---|---|---|---|
| 5,819,256 A * | 10/1998 | Ozbutun et al. | 707/2 |
| 6,278,460 B1 * | 8/2001 | Myers et al. | 345/424 |
| 6,628,427 B1 | 9/2003 | Aoki | |
| 6,704,758 B1 * | 3/2004 | O'Donnell | 708/290 |
| 6,856,708 B1 | 2/2005 | Aoki | |
| 6,882,365 B1 | 4/2005 | Aoki | |
| 6,947,076 B1 | 9/2005 | Kitaguchi | |
| 6,985,619 B1 | 1/2006 | Seta et al. | |
| 7,145,596 B2 | 12/2006 | Kitaguchi | |
| 7,379,621 B2 | 5/2008 | Aoki | |
| 7,428,007 B2 | 9/2008 | Kitaguchi | |
| 2004/0193629 A1 * | 9/2004 | Mozes | 707/100 |
| 2006/0087563 A1 * | 4/2006 | Duan | 348/208.99 |
| 2006/0168298 A1 | 7/2006 | Aoki | |
| 2007/0098302 A1 * | 5/2007 | Yamamoto | 382/300 |
| 2008/0144924 A1 * | 6/2008 | Hoffmann | 382/154 |
| 2009/0046924 A1 * | 2/2009 | Morimitsu | 382/154 |
| 2010/0283837 A1 | 11/2010 | Oohchida | |
| 2011/0014535 A1 * | 1/2011 | Choi et al. | 429/432 |
| 2011/0096185 A1 | 4/2011 | Aoki | |
| 2011/0134282 A1 | 6/2011 | Morita | |
| 2011/0216215 A1 | 9/2011 | Maruyama | |
| 2011/0304714 A1 * | 12/2011 | Akifusa et al. | 348/54 |

FOREIGN PATENT DOCUMENTS

| | | |
|---|---|---|
| JP | 2001 169310 | 6/2001 |
| JP | 3436074 | 8/2003 |
| JP | 2003 329439 | 11/2003 |
| JP | 2009 14445 | 1/2009 |
| JP | 2009 182879 | 8/2009 |
| JP | 2010 44009 | 2/2010 |
| JP | 2010 139275 | 6/2010 |

OTHER PUBLICATIONS

International Search Report Issued Nov. 1, 2011 in PCT/JP11/69854 filed Aug. 25, 2011.

* cited by examiner

CALIBRATION APPARATUS, A DISTANCE MEASUREMENT SYSTEM, A CALIBRATION METHOD AND A CALIBRATION PROGRAM

TECHNICAL FIELD

The present invention is related to a calibration apparatus for calibrating a parameter related to positions of imaging devices, wherein the parameter is set in a stereo camera type distance measurement system installed in a mobile object such as a car, etc., a distance measurement system including the calibration apparatus, a calibration method and a calibration program for executing the method.

BACKGROUND ART

Recently, a collision prevention apparatus, a following distance control apparatus, etc., are installed in the car because of the increased awareness of safety of the car and improved computer performance. The apparatuses output a warning to the driver if the following distance falls within a certain range, and performs control of a brake device, a steering device, etc., so as to perform operations for automatically preventing the collision if the following distance becomes further shorter.

In order to perform such control, it is necessary to measure the following distance and a stereo camera goes into actual use as a distance measurement system. The stereo camera can generate a distance image in front of the vehicle, recognize an obstacle from the distance image, and then measure a distance to the obstacle.

The distance measurement using the stereo camera is described hereinafter in detail. FIG. 1 is a diagram for explaining a principle of the distance measurement by the stereo camera in which two cameras are disposed in parallel. A camera $C_0$ with a focal length f, an optical center $O_0$ and an imaging plane $s_0$ is disposed such that a direction of an optical axis extends in a upper direction in FIG. 1, and a camera $C_1$ with the same focal length f is deposed in parallel with and spaced by a distance B with respect to the camera $C_0$ on the right side.

An image of a subject A which is located at a distance d from the optical center $O_0$ of the camera $C_0$ in the direction of the optical axis forms an image at $P_0$ which is an intersection of a straight line $AO_0$ and the imaging plane $s_0$. With respect to the camera $C_1$, the subject A forms an image at a point $P_1$ on the imaging plane $s_1$. Here, an intersection of a line and the imaging plane $s_1$, which line passes through the optical center $O_1$ of the camera $C_1$ and is parallel with the line $AO_0$, is indicated by $P'_0$, and the distance between the point $P'_0$ and the point $P_1$ is indicated by p. The point $P'_0$ is the same as the point $P_0$ on the camera $C_0$. The distance p indicates a deviation amount of the points on the images captured by these two cameras and is called parallax. Then, a triangle $AO_0O_1$ and a triangle $O_1P'_0P_1$ are geometrically similar and thus the following formula 1 is given.

$$d = Bf/p \quad \text{(Formula 1)}$$

where B represents a base line length of a side of the triangle. If the base line length and the focal length f are known, the distance d can be determined based on the parallax p.

That is the principle of the distance measurement by the stereo camera in which two cameras are disposed in parallel; however, in order for this to hold, two cameras $C_0$ and $C_1$ must be disposed precisely, as shown in FIG. 1. Especially, if there is a rotation of the camera around a Y axis shown in FIG. 1 or a misregistration of the imaging sensor in a lateral direction with respect to the optical center, the image position in an X axis direction which is a lateral direction perpendicular to the Y axis in FIG. 1 changes. In this case, the misregistration is directly added to the parallax, which decreases accuracy of the measured distance.

In order to keep the necessary accuracy of the measured distance, it goes without saying that a precise adjustment is necessary at the time of manufacturing; however, it is also necessary to perform calibration because the arrangement can change slightly due to a change in temperature, a vibration, etc., if it is used for a long time. However, if it is necessary to perform calibration using a test chart or the like which is disposed at the known distance after the purchase, convenience of a user decreases greatly. In connection with this, several ways of performing the calibration without necessitating using the test chart or the like are proposed which utilize an image obtained by capturing an ambient natural scene (see JP3436074 B2, JP2001-169310 A, and JP2009-182879 A).

JP3436074 B2 discloses a technique in which a deviation of the camera imaging direction is detected as an arbitrary location such as a road, and the calibration is performed based on the detection results. Specifically, the same stationary feature object is recognized from the captured images at several locations for calibration on a traveling road, the deviation of the camera imaging direction between plural imaging means is determined based on the locations of the stationary feature object in the captured images at the several locations for calibration and the distances between the several locations for calibration, and the calibration is performed by performing correction based on the determined deviation of the camera imaging direction.

According to JP2001-169310 A, detection of the parallax of the stationary object is performed at two times; a travel distance of a vehicle between these two times is calculated; an error due to the deviation of parallelism of the optical axes between two cameras is determined as a parallax offset amount; and then the detected parallax is corrected with the parallax offset amount.

According to JP2009-182879 A, in order to enable calculating a calibration value of a camera parameter without performing an object recognition process, plural points of interest are set in input images captured by imaging means at a predetermined frame rate; parallaxes of the respective points of interest and a two-dimensional optical flow are calculated; a road surface parameter is calculated, which parameter indicates a relationship between a road surface included in the input image and the imaging means based on the parallaxes and vertical components of the points of interest; and then the calibration value of a camera parameter is calculated based on the optical flow, the parallaxes and the road surface parameter.

However, according to the method disclosed in JP3436074 B2, it is necessary to store a shape of the stationary subject. Thus, if there is no stationary subject stored, it is not possible to perform calibration. A green traffic signal or a traffic sign is used as the stationary subject; however, a shape or size of the traffic signal or a traffic sign is different depending on a region or a country and may be changed in the future. Therefore, according to this way of identification of the stationary subject with a registered shape, there is a possibility that the calibration cannot be performed successfully.

Further, similarly, according to the method disclosed in JP2001-169310 A, the shapes of the stationary subjects are registered and the calibration is performed by identifying the stationary subject based on the registered shapes. Thus, with respect to the stationary subject with a different shape due to the difference in a region or a country or a change in the future, it may be determined to be different from the registered stationary subjects and thus the calibration cannot be performed.

Further, according to the method disclosed in JP2009-182879 A, feature points are extracted from a light and shade pattern on the road surface; a distance measurement is performed using the feature points; road parameters indicating the position and the direction of the road surface are calculated; and the parallax offset is calculated based on the change in the road parameters. Thus, as long as the car travels, there is a high probability that a flat road surface exists immediately in front of the car, and thus the problem that the subject cannot be found is unlikely to occur. Further, since it is not necessary to recognize the subject with a particular shape, the problem that the calibration cannot be performed does not occur.

However, since a source of information for calculating the parallax offset is limited to the road surface, it is not possible to make advantageous use of stationary subjects other than a flat subject, such as a wall, a building, a pole, etc. Therefore, it cannot be applied to an application other than a on-vehicle application, such as an indoor application, in particular.

Further, since the light and shade on the road surface are fine and the number of the feature points decreases at a long distance, only a distance measurement at a short distance can be done and it cannot be utilized for the calibration. Depending on the purpose such as a following distance auto adjustment, etc., there may be a case where a preceding vehicle at a longer distance is desired to be measured. Thus, this may affect accuracy of the calibration.

For this reason, a calibration apparatus and a method are desired which can correct time-varying deviation (misregistration) of the stereo camera. In particular, such a calibration apparatus and a method are desired which can perform the calibration by utilizing various images captured during the traveling to detect a parallax offset with stability without depending on sensors other than a camera for measuring the own position information, such as a vehicle speed sensor, etc., and without relying on the existence of the subject with a particular shape such as a traffic signal or a flat road surface.

SUMMARY OF INVENTION

In order to achieve the aforementioned objects, a calibration apparatus is provided for calibrating a parameter related to positions of two imaging devices, the parameter being set in a distance measurement system which is installed in a mobile object and performs distance measurement with the imaging devices, the calibration apparatus comprising:

an image obtaining part configured to receive inputs of two reference images and plural items of parallax data, these two reference images being captured by one of the imaging devices at two locations, the parallax data being calculated using these two reference images and two corresponding images based on positions of plural feature points common to the reference image and the corresponding image for each pair thereof on a location basis, these two corresponding images being captured by another of the imaging devices at these two locations;

a feature point searching part configured to search for plural feature points common to the two reference images;

a parallax calculating part configured to calculate parallaxes and parallax changing amounts thereof, based on the parallax data related to the respective feature points in these two reference images, for each of the searched for feature points: and a correction value calculating part configured to calculate a correction value for the parameter related to the positions of the imaging devices based on the calculated parallaxes and parallax changing amounts thereof.

With this arrangement, since the parallaxes and the parallax changing amounts are calculated and the correction value can be calculated independently from the distance between the locations at the time of imaging, a sensor for measuring the own position such as a vehicle speed sensor or the like is not necessary, and it is possible to calculate the correction value with stability even if there is no subject with a particular shape. Thus, it can be performed repeatedly on a regular basis, and the accuracy of the distance measurement can be kept constant by performing the correction on an as-needed basis.

The correction value calculating part is configured to create a model curve using the calculated parallaxes and parallax changing amounts thereof and calculate the correction value based on the model curve. The model curve can be a quadratic curve and expressed by a quadratic function whose displacement in parallax direction is calculated as the correction value. This is because this displacement indicates an amount of a displacement of the imaging devices.

Further, the calibration apparatus further includes a reliability evaluating part configured to evaluate the presence or absence of reliability of the correction value based on a distribution of the parallaxes and dispersion of the parallax changing amounts with respect to the model curve. By evaluating the reliability in such a manner, it is possible to detect a condition which leads to a detrimental effect in calculating the correction value from the image itself without relying on external sensors or the like other than the imaging devices. Thus, the applicability is high and the calibration can be implemented with high accuracy.

The reliability evaluating part extracts only the data of the parallax changing amounts which are within a predetermined range from the parallax changing amounts on the model curve, calculates an average root-mean-square of differentials between the parallax changing amounts of the extracted data and the parallax changing amounts for the corresponding parallaxes on the model curve, and determines whether the calculated average root-mean-square is smaller than or equal to a threshold. If it is smaller than or equal to the threshold, it is determined that there is reliability.

Further, the reliability evaluating part calculates the proportion of the parallaxes included in the specified parallax range, and determines whether the calculated proportion is greater than or equal to a predetermined proportion. If it is greater than or equal to the predetermined proportion, it is determined that there is reliability. These two evaluation criteria may be applied, and it is possible to determine that there is reliability if these two evaluation criteria are met. By performing the determination with these two evaluation criteria, it is possible to implement the calibration with higher accuracy.

The calibration apparatus may include a normalization processing part configured to normalize the parallax changing amounts; and a data storing part configured to store the normalized parallax changing amounts such that they are associated with the corresponding parallaxes. The correction value calculating part may calculate the correction value for the parameter related to the positions of the imaging devices based on the stored parallaxes and the normalized parallax changing amounts.

The normalization processing part calculates the normalized parallax changing amount by dividing the parallax changing amount by a proportional factor of a quadratic function representing a model curve. With such normalization, it is possible to simplify the calculation and perform the calibration with higher accuracy because a number of the items of the stored data can be used.

The reliability evaluating part can evaluate the presence or absence of the reliability of the correction value based on the number of the items of the data stored in the data storing part. This is because the more the number of the data items becomes, the higher the reliability becomes.

According to the present invention, in addition to the calibration apparatus, a distance measurement apparatus including the calibration apparatus can be provided. The distance measurement system includes two imaging devices with the same focal length, the imaging devices being spaced apart and disposed such that the respective imaging planes are on the same straight line; a parallax data generating apparatus configured to calculate and output plural items of parallax data, the parallax data being calculated using these two reference images and two corresponding images based on positions of plural feature points common to the reference image and the corresponding image for each pair thereof on a location basis, these two corresponding images being captured by another of the imaging devices at these two locations; and the calibration apparatus.

The parallax data generating apparatus obtains the correction value from the calibration apparatus, performs the correction for the plural items of parallax data using the correction value, and outputs the corrected parallax data to the calibration apparatus. By repeating these processes, it is possible to constantly perform the calibration and the distance measurement can be implemented constantly with high accuracy.

According to the present invention, a calibration method can be provided, the method including process steps which are executed by the corresponding parts of the calibration apparatus, and the corresponding parts and apparatuses of the calibration apparatus included in the distance measurement system. Further, it is also possible to implement a program which causes a computer to execute the process steps. This program can be provided by being stored in a computer readable recording medium. Thus, according to the present invention, it is also possible to provide the recording medium on which the program is recorded.

Figure 1:
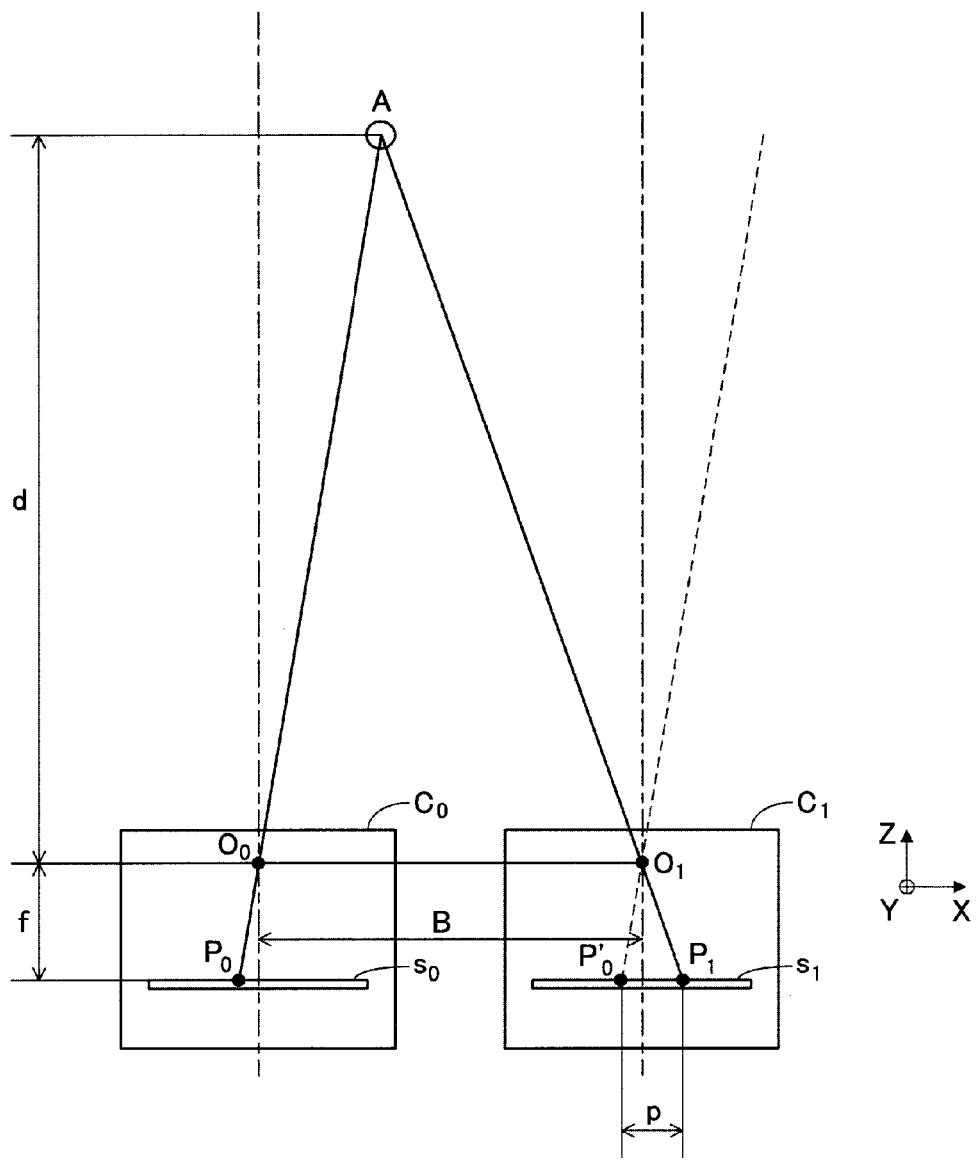
FIG. 1 is a diagram for illustrating a relationship between a distance measurement system and a subject.

EXPLANATION FOR REFERENCE NUMBERS 10 distance measurement system
20, 21 imaging devices
30 distance calculation device
31 flash memory
32 DRAM memory
33 CPU
34 connection interface
35 bus
100 imaging control part
110 parallax data generating part
120 parallax offset detecting part
200 preceding car
210 oncoming car
220 ground surface
230 light and shade patterns
240 building
250 traffic sign
260 mountain
300 image obtaining part
310 feature point searching part
320 parallax calculating part
330 correction value calculating part

BEST MODE FOR CARRYING OUT THE INVENTION

In the following, the best mode for carrying out the present invention will be described in detail by referring to the accompanying drawings.

Figure 2:
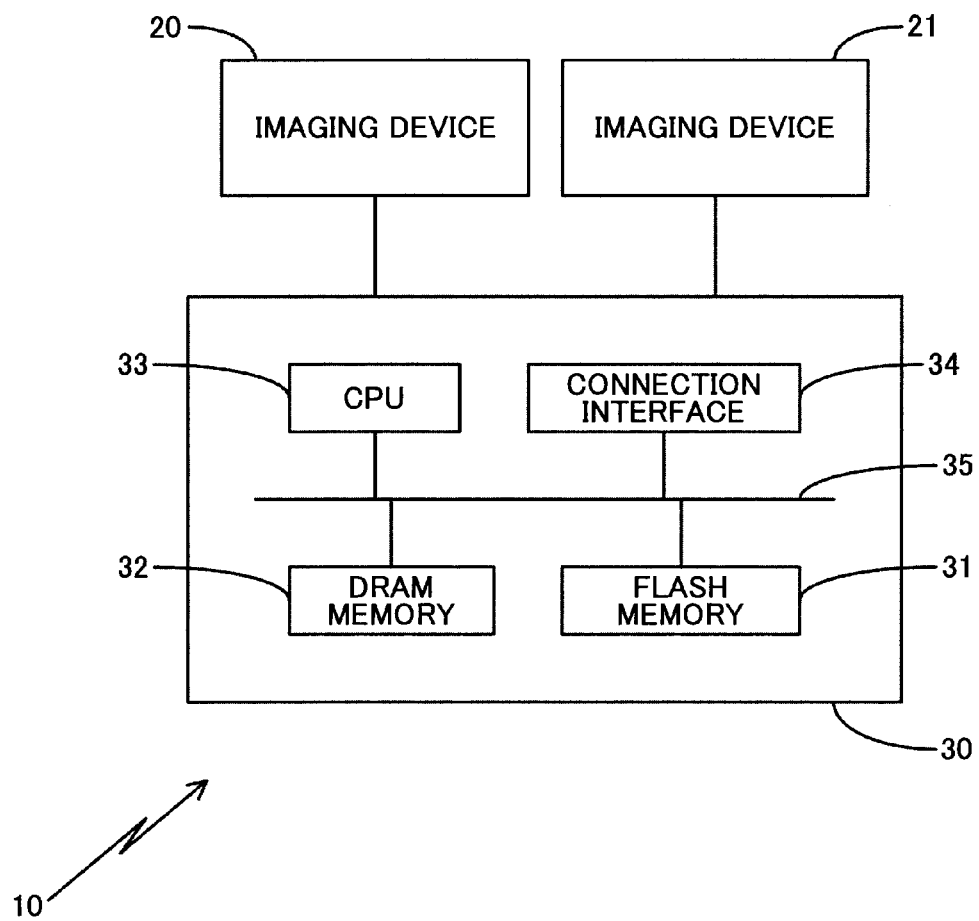
FIG. 2 is a diagram for illustrating an example of a hardware configuration of a distance measurement system.

FIG. 2 is a diagram for illustrating a hardware configuration of a distance measurement system according to the present invention. This distance measurement system 10 is a stereo camera, for example, and includes two imaging devices 20, 21 for imaging a subject; and a distance calculation device which receives an input of image data of images captured by the imaging devices 20, 21 and calculates a distance from the system to the subject based on the images.

The imaging devices 20, 21 are cameras with the same focal length. The imaging devices 20, 21 are spaced apart by a certain distance and disposed such that the respective imaging planes are positioned on the same straight line. Thus, the optical axes, which are perpendicular to the imaging planes with the same focal length, are parallel with each other. A camera, which can be used as the imaging devices 20, 21, includes a body; a lens for collecting light; an iris for adjusting a light amount; a finder for finding the subject; an image sensor (an optical sensor) for converting the received light to an electric signal; and an image processing circuit.

The electric signal output from the image sensor is analog data which is converted to digital data by an A/D converter and then input to the image processing circuit. The image processing circuit, which is also called as an image engine, performs the image processing such as an interpolation calculation, a color space conversion, a gamma correction, an astigmation correction, a noise reduction, an image compression, etc., to output to the distance calculation device 30.

The distance calculation device 30 controls the imaging devices 20, 21. The distance calculation device 30 receives the processed image data output from the imaging devices 20, 21, calculates the distance to the subject based on these two items of the image data, and displays the result on the display device, etc. The distance calculation device 30 includes a software resource for implementing these processes. The distance calculation device 30 executes this software to calculate the distance based on these two items of the image data. For this purpose, the distance calculation device 30 includes a nonvolatile flash memory 31 for storing the software; a CPU 33 for reading the software from the flash memory 31 via a DRAM memory 32 to execute it; and a connection interface 34 such as a USB, IEEE 1394, etc. The flash memory 31, the DRAM memory 32, the CPU 33 and the connection interface 34 are connected via a bus 35. The software is read via the bus 35 and control signals are transmitted to the imaging devices 20, 21. The image data can be received from the imaging devices 20, 21 via the connection interface 34 and the bus 35.

Figure 3:
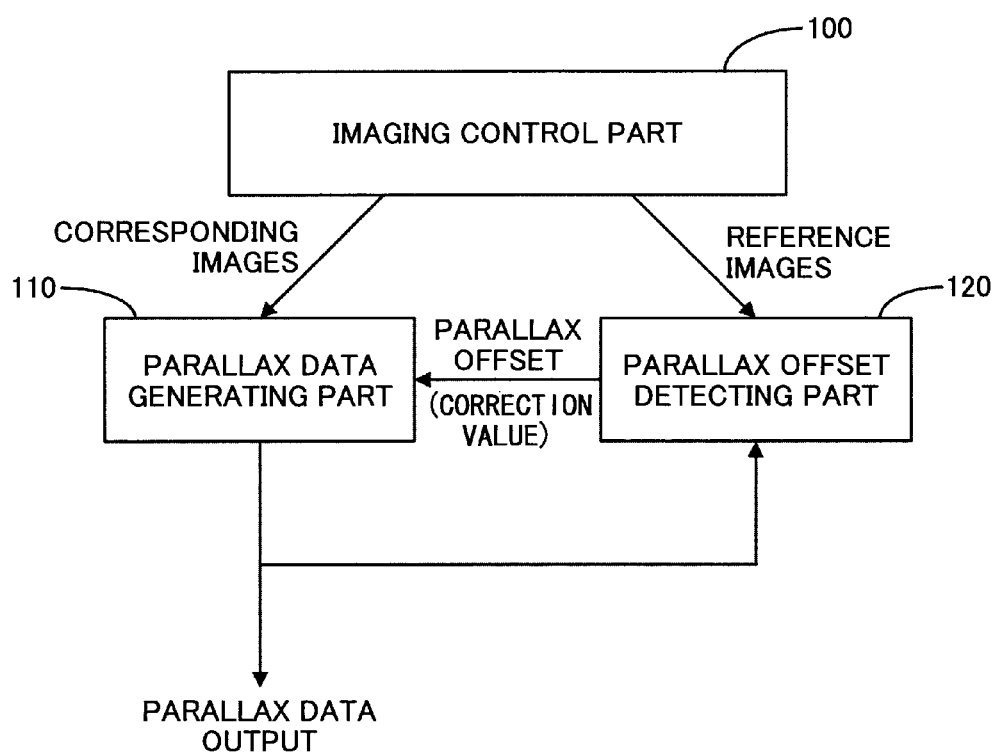
FIG. 3 is a functional block diagram of the distance measurement system including a calibration apparatus according to the present invention.

When the CPU 33 executes the software, the distance calculation device 30 functions as an imaging control part 100 for controlling the imaging devices 20, 21; a parallax data generating part 110 for generating parallax data from the images of the image data input from the imaging control part 100; and a parallax offset detecting part 120 for calculating the parallax offset as a correction value using reference images input from the imaging control part 100 and parallax data input from the parallax data generating part 110, as shown in FIG. 3.

The imaging control part 100 performs synchronization, initialization, exposure control, etc., of the imaging devices 20, 21 and inputs the image data captured by the imaging devices 20, 21 to the parallax data generating part 110 and the parallax offset detecting part 120. It is noted that image correction process other than the parallax offset, such as distortion by an optical system, rotation of image, etc., which may be effective for the stereo distance measurement in general, may be performed as necessary. Thus, the processes the image engine of the imaging devices 20, 21 perform can be performed in the imaging control part 100. In this case, the imaging devices 20, 21 may not include the image engine.

The parallax data generating part 110 performs processing similar to the distance measurement processing by an ordinary stereo camera. However, by using the parallax offset generated by the parallax offset detecting part 120 as a correction value for calibrating a parameter related to the positions of the imaging devices 20, 21, it is possible to reduce the measurement accuracy deterioration due to aging of the hardware. This process is described hereinafter.

The parallax offset detecting part 120 functions as a calibration apparatus which calculates the parallax offset as a correction value using the reference images and the parallax data, and sends the calculated parallax offset to the parallax data generating part 110 which functions as a parallax data generating apparatus in which the calculated parallax offset is subject to the subsequent parallax data generation process.

Here, the parallax offset is an error which indicates a parallel displacement of the captured image of the imaging device 20 as a whole in a stereo base line direction. The parallax offset results from a displacement of the image sensor with respect to the optical center. Further, a deformation of the image due to the rotation of the imaging device 20 as a whole around the optical axis perpendicular to the stereo base line direction, which is a keystone distortion by a perspective conversion in the strict sense, can be approximately regarded as a parallel displacement in the case of a very small rotation angle, and thus this can be handled as the parallax offset. It is noted that the correction of the parallax offset is important because the parallax offset is directly added to the parallax of the stereo camera and thus has a significant influence on the distance measurement accuracy at long distances in particular.

In the present invention, it is assumed that there is no other misregistration such as a displacement in an up-and-down direction, a rotation in a plane, etc. In practice, it is preferred that such other misregistration is corrected by using other calibration techniques. Next, the parallax offset detection process is described in detail.

As described above, the formula 1 is given if it is assumed that the base line length is B, the focal length is f, the distance is d and the parallax is p. The following formula 2 can be given by differentiation of the formula 1, using the distance d, the base line length B, the focal length f and the parallax p.

$$p' = \frac{-Bf}{d^2} = \frac{-p^2}{Bf} \quad \text{(Formula 2)}$$

In the formula 2, p' is a derivative of the parallax p with respect to the distance d and thus indicates a parallax changing amount when the distance changes by a certain amount, 1 m, for example. The changing amount with respect to the change in the distance varies with the distance; however, the formula 2 indicates that the parallax changing amount is always proportional to the square of the parallax.

If the imaging devices 20, 21 installed on the car capture the images when the car travels in a straight line, all the stationary objects within the field of view approach the imaging devices 20, 21 with a constant speed. For example, let us consider the case of imaging the scene shown in FIG. 4. The preceding car 200 and the oncoming car 210 captured within the field of view move with respect to the stationary ground surface 220 and thus they are mobile objects. Many objects within the field of view, such as other light and shade patterns 230 of the ground surface, a building 240 along the road, a traffic sign 250, and a background scene such as a mountain 260, are stationary. The stationary object can be seen in the car such that it approaches the car with a constant speed. Thus, the formula 2 should hold true regardless of the position of the stationary object. Thus, if the parallax and the parallax changing amount are determined with respect to the respective feature points in the captured image, such as the feature points of the building 240 along the road and are plotted, it is anticipated that they are on a curve representing the formula 2. To the contrary, the parallax changing amount related to the mobile object such as the preceding car 200, etc., is greater or smaller than that of the stationary object existing at the same parallax (distance), and thus it is plotted off of the curve. Therefore, it is possible to determine whether the object is the mobile object or the stationary object based on whether the parallax changing amount is on or off of the curve.

Figure 5:
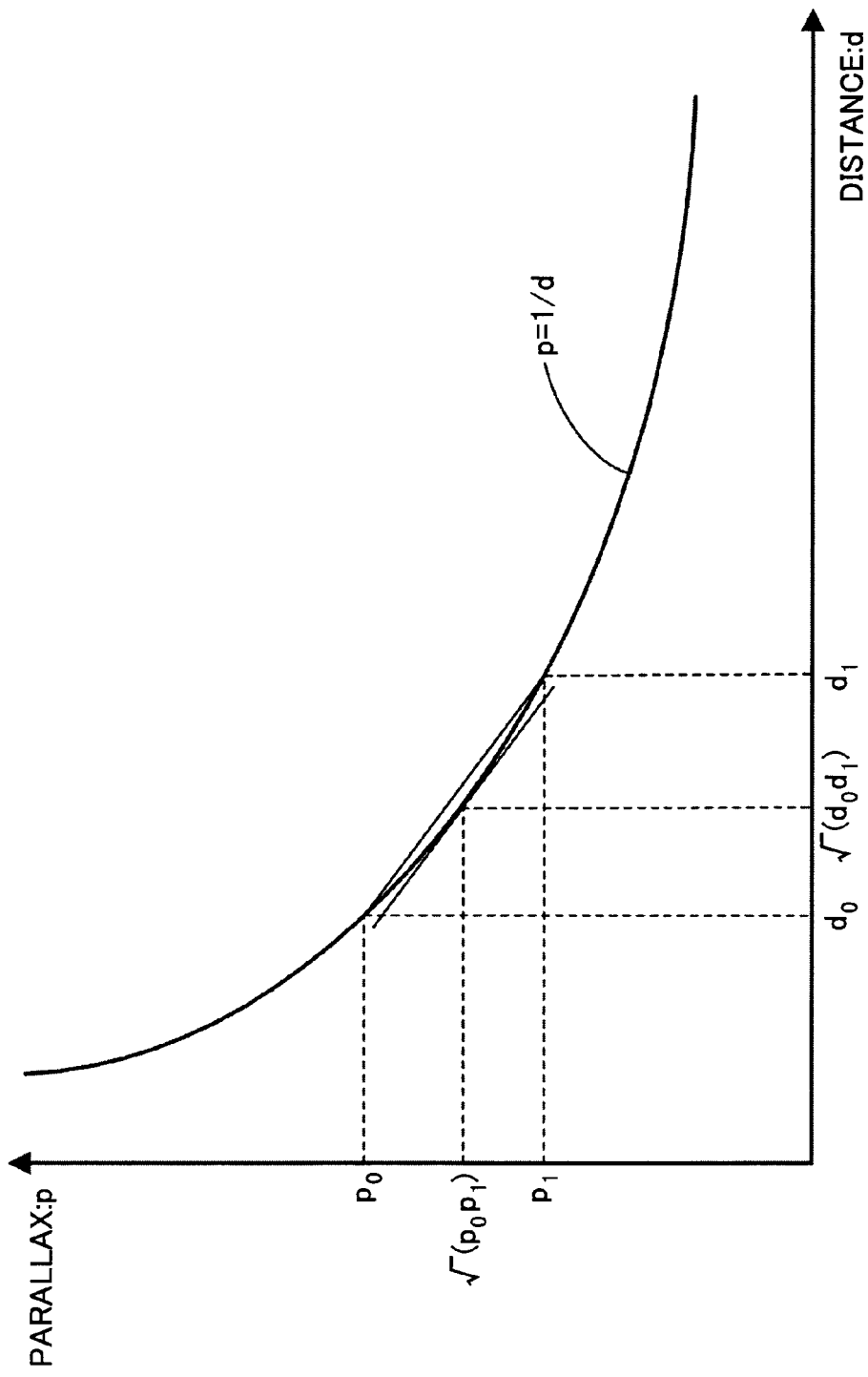
FIG. 5 is a diagram for illustrating a relationship between a distance to the subject and a parallax.

Next, a way of calculating the parallax and the parallax changing amount is described. FIG. 5 is a diagram for illustrating a relationship between a distance d from the optical center to the subject and a parallax p. In order to simplify the explanation, it is assumed that a proportional factor is 1. As shown in FIG. 5, when $p_0$, $p_1$ indicate the parallaxes measured at these two locations of distances $d_0$, $d_1$, respectively, the ratio of the difference between the parallaxes to the difference between the distances can be given by the following formula 3, using a relationship $p_i = 1/d_i$.

$$\frac{(p_1 - p_0)}{(d_1 - d_0)} = \frac{\left(\frac{1}{d_1} - \frac{1}{d_0}\right)}{(d_1 - d_0)} = \frac{-1}{d_1 d_0} \quad \text{(Formula 3)}$$

According to the formula 3, a point on the curve p=1/d which has this gradient has a distance given by the formula 4 and the parallax p given by the formula 5, using the relationship $$p' = \frac{-1}{d^2}.$$

$$d = \sqrt{d_1 d_0} \quad \text{(Formula 4)}$$

$$p = \sqrt{p_1 p_0} \quad \text{(Formula 5)}$$

Thus, if the parallaxes measured at two locations are $p_0$, $p_1$, respectively, a representative parallax between the points is given by the formula 5 and the parallax changing amount can be calculated by the formula 6.

$$p' = p_1 - p_0 \quad \text{(Formula 6)}$$

In contrast to the formula 3, this formula 6 is not divided by the change in the distance ($d_1$-$d_0$). This is because the travel distance of the host car is not known from the image only. Thus, this p' contains an undefined factor of a constant multiple according to the distance between these two locations. However, this formula can work because the formula 2 holds true with respect to a pair of the corresponding images at the same travel distance, and a comparison with the measurement data at two other points can be performed by normalizing the heights after the extraction of the quadratic curve described hereinafter. Further, the formula 5 holds true if the parallax offset is not included; however, since the parallaxes $p_0$, $p_1$ measured in practice include the parallax offset, the formula 5 does not hold in the strict sense. Thus, in order to simplify the calculation, the formula 5 can be replaced with the following formula 7.

$$p = \frac{(p_0 + p_1)}{2} \quad \text{(Formula 7)}$$

Next, a way of calculating the parallax offset is described. Since the parallax measured in practice includes the parallax offset, the parallax p deviates from a true parallax $p_t$ by $p_{off}$.

$$p = p_t + p_{off} \quad \text{(Formula 8)}$$

Figure 6:
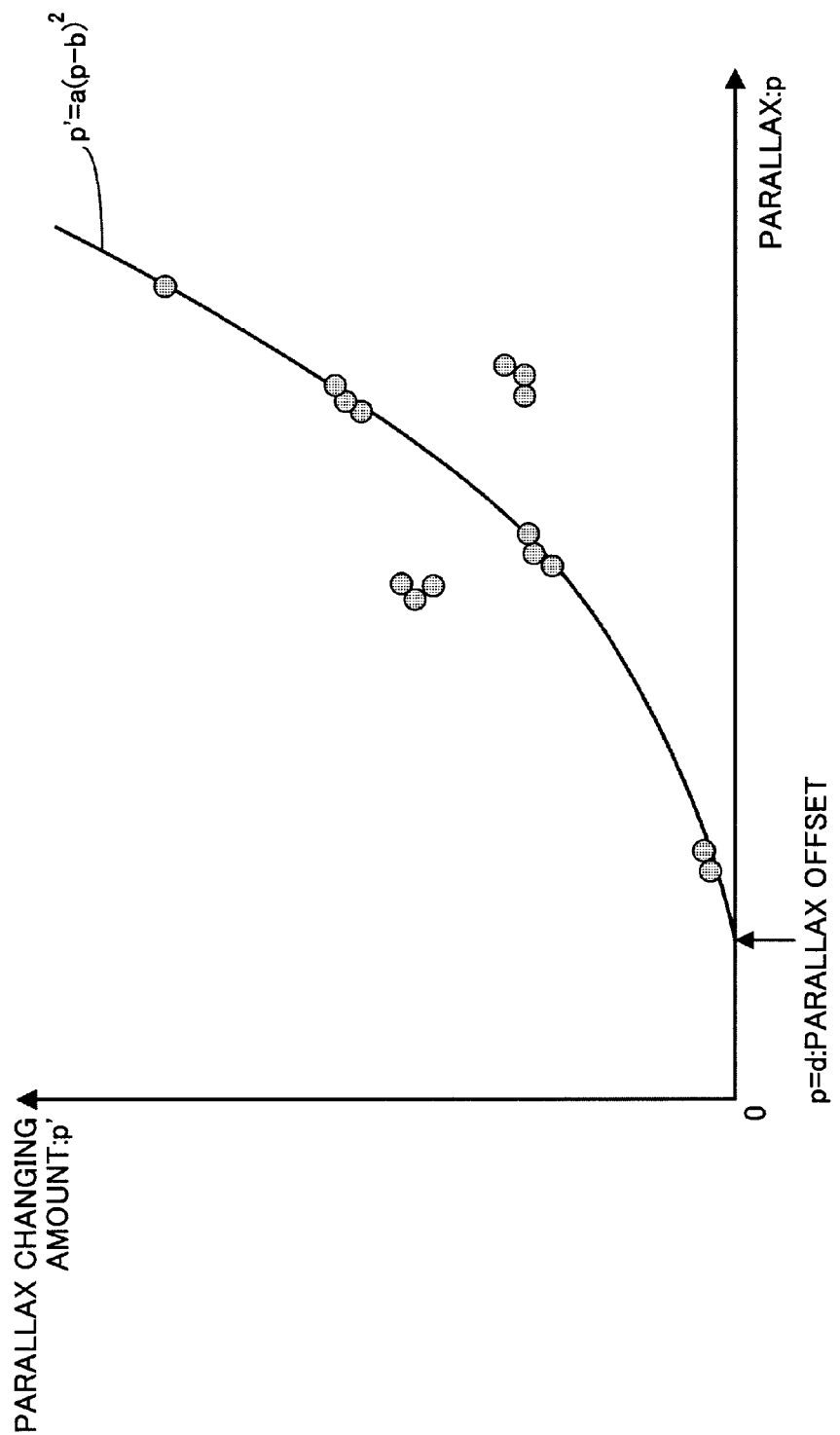
FIG. 6 is a diagram for illustrating a relationship between the parallax and a parallax changing amount.

On the other hand, the parallax changing amount p' is a difference between the parallaxes which include the parallax offsets, as shown in FIG. 6, which are canceled at a subtraction, and thus it can be considered that the parallax changing amount p' is the same as a true parallax changing amount. Therefore, the relationship between the parallax including the parallax offset and the parallax changing amount is on the curve which is offset in the p axis direction by $p_{off}$ with respect to an ideal relationship of the formula 2. The formula of this curve can be given as follows.

$$p' = a(p_t - p_{off})^2 \quad \text{(Formula 9)}$$

The curve of the formula 9 is extracted from the relationship between the parallaxes measured and the parallax changing amount by expressing the detected line by an equation, such as Hough transform or the like. Then, the parallax offset can be calculated as the displacement in the p axis direction, that is to say, the x intercept of the curve. Alternatively, it is also possible to take the square root of both sides of the formula 9 and extract the straight line by the Hough transform to express the relationship between the parallax p and p'.

In the following, normalization and accumulation are described. The coefficient a is a proportional factor according to BF of the formula 2 and the distance between two locations of imaging, that is to say, the distance p' obtained from the formula 6. The parallax changing amount p' is constant-multiplied when the distance between two locations increases or decreases. Therefore, normalization of the value p', that is to say, the amount of p' divided by a is stored and accumulated. The amount $p'_{nor}$ can be given as follows.

$$p'_{nor} = \frac{p'}{a} = (p_t - p_{off})^2 \quad \text{(Formula 10)}$$

The parallax changing amount $p'_{nor}$ thus normalized does not depend on the distance between two locations. Thus, if a number of the normalized parallax changing amounts are stored as data in which they are associated with the parallaxes, it is possible to precisely calculate the parallax offset based on the stored data.

Figure 7:
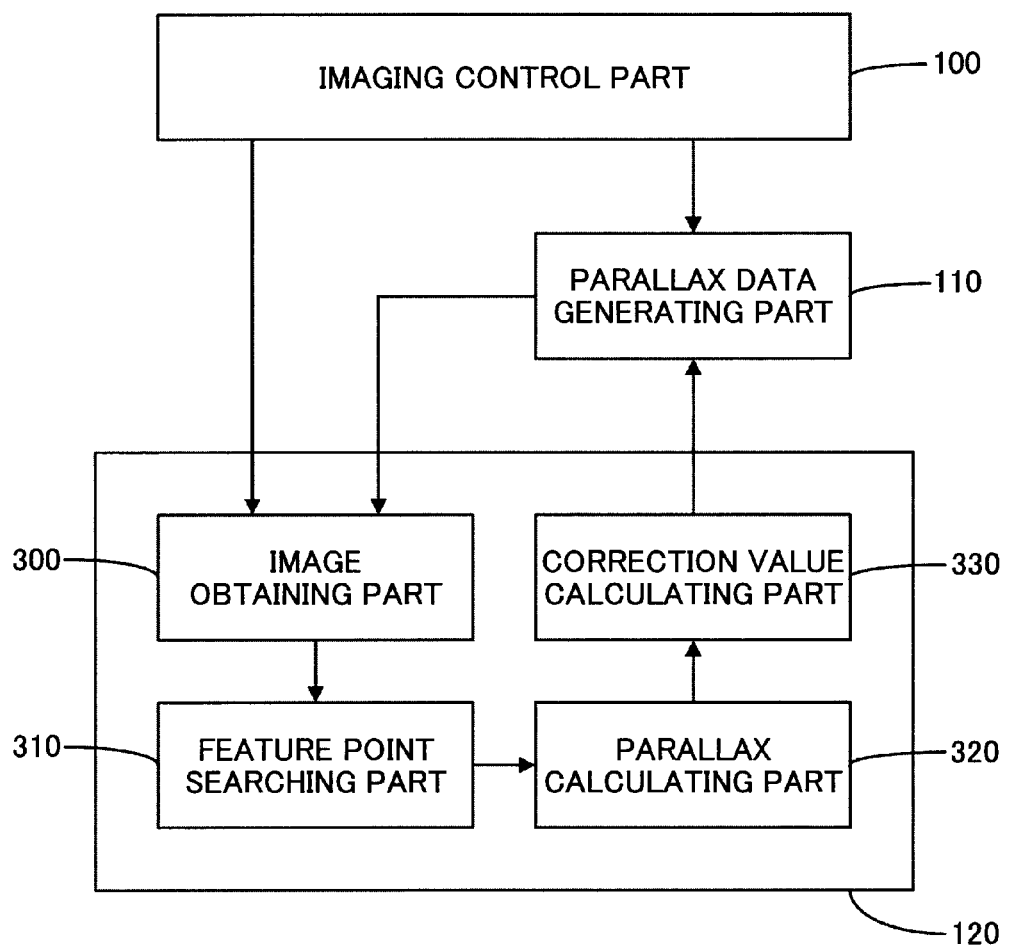
FIG. 7 is a functional block diagram of a parallax offset detection processing part as a calibration apparatus.

As described above, the parallax offset detecting part 120, which can be used as the calibration apparatus according to the present invention, can include the following parts. FIG. 7 is a diagram for illustrating a configuration of the parallax offset detecting part 120. The parallax offset detecting part 120 includes an image obtaining part 300 configured to obtain fundamental images from the imaging control part 100 and the parallax from the parallax data generating part 110, respectively; a feature point searching part 310; a parallax calculating part 320; and a correction value calculating part 330.

The image obtaining part 300 obtains two images as reference images which are captured by one imaging device 20 of the imaging devices 20, 21 at any two locations. Further, the image obtaining part 300 obtains plural items of the parallax data. The parallax data generating part 110 obtains two images as corresponding images which are captured by another imaging device 21 of the imaging devices 20, 21 at the same two locations. The parallax data is calculated by the parallax data generating part 110 from plural feature points common to the reference image and the corresponding image for each of the locations, using these two corresponding images and these two reference images obtained from the imaging control part 100.

The feature point searching part 310 searches for plural feature points which are common to these two reference images obtained by the image obtaining part 300. The feature points are a building, a road traffic sign, a scene such as a mountain, a light and shade pattern on the road surface, a preceding car, an oncoming car, etc. The parallax calculating part 320 calculates the parallax and the parallax changing amount associated with the parallax, respectively, based on the parallax data related to the respective feature points in these two reference images for each of the searched for feature points. Specifically, the parallax calculating part 320 calculates the representative parallax from the parallaxes at the respective locations using the formula 5 and the parallax changing amount associated with the representative parallax using the formula 6 or 7. The correction value calculating part 330 calculates the correction value for a parameter related to the positions of the imaging devices 20, 21 based on the parallaxes and the parallax changing amounts calculated by the parallax calculating part 320.

With this arrangement, since the parallaxes and the parallax changing amounts are calculated and the correction value can be calculated independently from the distance between the locations at the time of imaging, a sensor for measuring the own position such as a vehicle speed sensor or the like is not necessary, and it is possible to calculate the correction value with stability even if there is no subject with a particular shape. Thus, it can be performed repeatedly on a regular basis, and the accuracy of the distance measurement can be kept constant by performing the correction on an as-needed basis.

Specifically, the correction value calculating part 330 generates a model curve using the calculated parallaxes and the parallax changing amounts, and calculates the correction value, that is to say, the parallax offset from the model curve. This model curve can be a quadratic curve and can be expressed as a quadratic function. Thus, it is possible to calculate the displacement in a parallax direction as the correction value.

Figure 4:
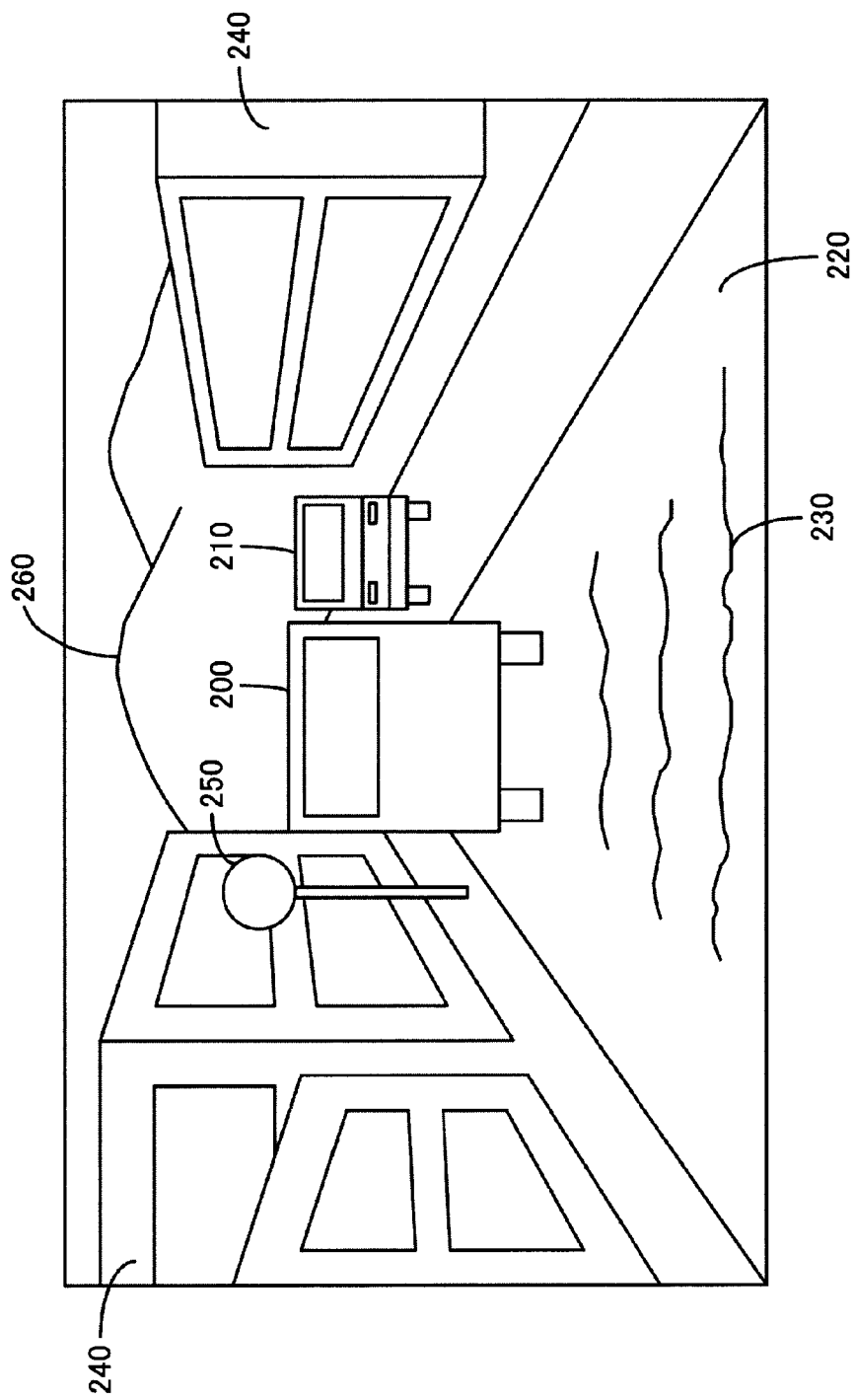
FIG. 4 is a diagram for illustrating an example of an image captured by the distance measurement system.

Although the principle of the parallax offset detection, and the configuration of the calibration apparatus utilizing the principle are described above, it is desired to evaluate reliability of the calculated correction value in utilizing the principle. Specifically, as shown in FIG. 4, the captured image includes stationary subjects distributed from a short distance to a long distance. If the area of the moving subject is relatively small, the relationships between the parallaxes and the parallax changing amounts are distributed as shown in FIG. 6, and the model curve expressed by the formula 9 can be extracted.

For example, if only the data around a particular parallax is measured when the preceding car 200 exists at a short distance in front of the imaging devices 20, 21 and it occupies the great majority of the field of view, there is a possibility that the extracted curve includes a significant error, as shown at the upper portion or the lower portion of the curve in FIG. 6. It is desired to detect such a bad condition and reject it.

Figure 8:
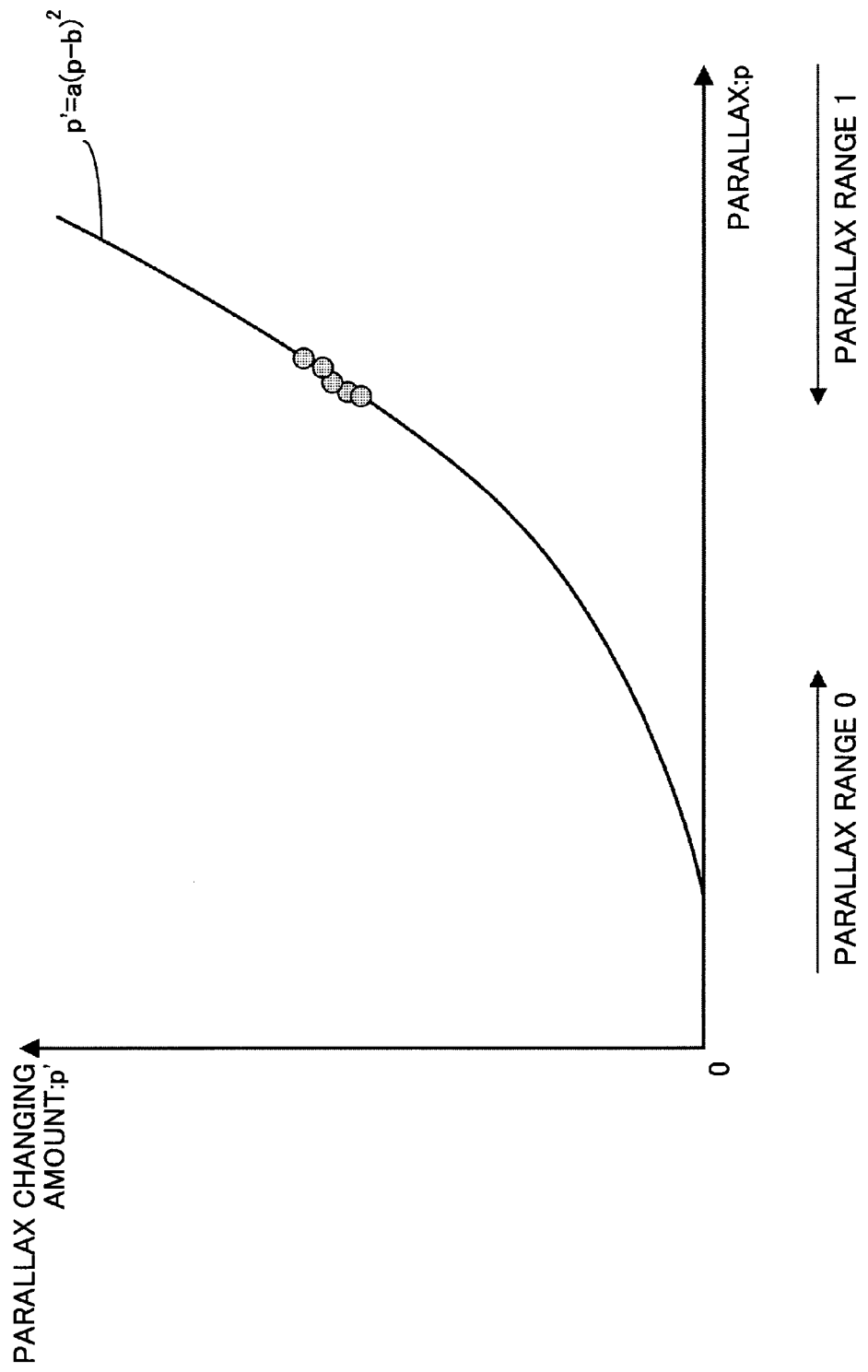
FIG. 8 is a diagram for illustrating a distribution of the parallax for evaluating reliability of a correction value.

Thus, the data near the model extracted in evaluating the dispersion is checked whether the parallaxes p are distributed widely. For example, as shown in FIG. 8, ranges of the parallax are defined, and if more than 20 percent of the data points in all the measurement data exist in these two parallax regions indicated by 0 and 1, it is determined that there is reliability. In the example shown in FIG. 8, since the data exists only in the parallax region indicated by 1, it is determined that there is not reliability.

The case has been considered where the stationary object is imaged with the distance measurement system installed in the vehicle traveling in a straight line. However, even in the case of the vehicle traveling in a straight line, it can rotate slightly in an up-and-down direction or a left and right direction and thus the parallax changing amounts for all the stationary objects are not constant. Further, the feature points measured in connection with a human moving at a slow speed may be near the ideal model curve and thus adversely affect the approximation. For this reason, in order to implement the practical calibration process, it is necessary to reduce an adverse effect due to the subject other than the stationary objects traveling in a straight line.

Thus, the distribution of the parallax changing amounts near the extracted model curve is examined. The variation of the measured parallaxes depends on noise characteristics of the optical sensors and image-forming characteristics of the optical systems, and can be measured. Thus, if the dispersion of the parallax changing amount data with respect to the model curve is sufficiently greater than a variation expected in advance, it is assumed that the data is not on the curve naturally and the data is removed in calculating the parallax offset.

Figure 9:
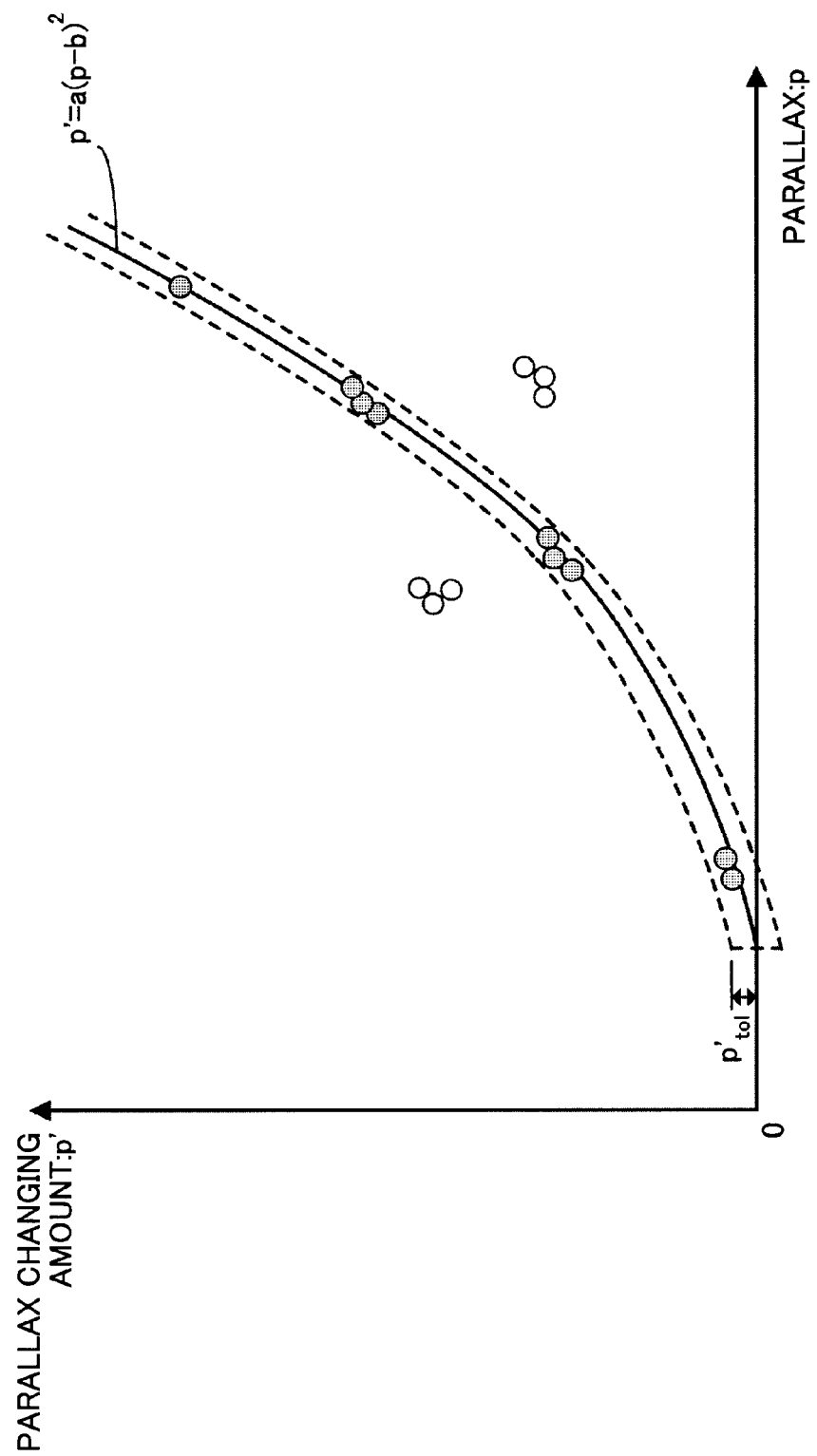
FIG. 9 is a diagram for illustrating a variation of the parallax changing amount for evaluating reliability of a correction value.

A concept of the reliability evaluation with the variation is shown in FIG. 9. In order to remove the feature points which are clearly not stationary, only the data near the extracted model curve, among the feature points plotted in a p-p' space, is extracted. As shown in FIG. 9, only the data points within the upper and lower ranges $p'_{tol}$ (i.e., a range between the broken lines) with respect to the model curve are extracted, and other data indicated by white circles is removed.

For the extracted feature data, the average root-mean-square of the differentials between the measurements and the approximated model is calculated and if the average root-mean-square is smaller than or equal to a predetermined threshold, it is determined that there is reliability. This can be expressed by the following formula 11.

$$E = \text{ave}((p' - a(p - p_{off})^2)^2) \quad \text{(Formula 11)}$$

The threshold may be set in advance according to the variation of the detected parallaxes. The threshold may be varied according to the distance or the brightness.

As described above, space defined by two parameters, that is to say, the parallax and the parallax changing amount is focused on. By utilizing the parameter space, the following advantages can be obtained.

(1) The parallax changing amount is free from the parallax offset.

The parallax changing amount is a differential between the measured parallaxes as expressed by the formula 6, and thus the effect of the parallax offset can be eliminated.

(2) It is possible to directly express the parallax offset.

As expressed by the formula 6, it is possible to calculate the parallax offset as the x intercept of the model curve.

(3) It is possible to perform normalization.

Although the parallax changing amount may change with the travel distance of the host car and the distance to the subject, the proportional relationship of p' with respect to $p^2$ does not change. Thus, recording is enabled by normalizing the proportional factor even if the travel distance is unknown.

According to the present invention, in order to make use of such a property, by making the most of a number of the measurement locations and feature point data, it is possible to precisely estimate the parallax offset.

Thus, the parallax offset detecting part 120 can include, in addition to the respective parts shown in FIG. 7, a reliability evaluating part for evaluating the presence or absence of the reliability of the correction value based on the distribution of the parallaxes and the dispersion of the parallax changing amounts with respect to the model curve. The reliability evaluating part evaluates the reliability as described above. Since the reliability evaluating part evaluates the reliability, it is possible to detect a condition which leads a detrimental effect in calculating the correction value from the image itself without relying on external sensors or the like other than the imaging devices 20, 21. Thus, the applicability is high and the calibration can be implemented with high accuracy.

Specifically, the reliability evaluating part extracts only the data in which the calculated parallax changing amounts are within a predetermined range with respect to the parallax changing amounts on the model curve; rejects other data; calculates the average root-mean-square of the differentials between the parallax changing amounts of the data within the predetermined range and the corresponding parallax changing amounts for the parallaxes on the model curve; and determines whether the calculated average root-mean-square is smaller than or equal to the threshold. If it is smaller than or equal to the threshold, it is determined that there is reliability. The predetermined range can be determined based on the accumulated data or practical experience, and corresponds to the upper and lower ranges $p'_{tol}$ in the case of FIG. 9.

Further, the reliability evaluating part calculates the proportion of the parallaxes included in the parallax range specified in advance, and determines whether the calculated proportion is greater than or equal to a predetermined proportion. The parallax range corresponds to the parallax regions indicated by 0 and 1 in the case of FIG. 8. If the calculated proportion is greater than or equal to a predetermined proportion, it is determined that there is reliability. This is because if the data is distributed over a wider parallax range, the reliability becomes higher correspondingly. These two evaluation criteria may be applied, and it is possible and preferred to determine that there is reliability if these two evaluation criteria are met. By performing the determination with these two evaluation criteria, it is possible to implement the calibration with higher accuracy.

Further, the parallax offset detecting part 120 can include a normalization processing part for normalizing the parallax changing amount; and a data storing part for storing the normalized parallax changing amount such that it is associated with the parallax. In this case, the correction value calculating part 330 can calculate the correction value for the parameter related to the positions of the imaging devices 20, 21 based on the parallaxes and the normalized parallax changing amounts stored in the data storing part.

The normalization processing part uses the formula 10 to calculate the normalized parallax changing amount by dividing the parallax changing amount by the proportional factor of the quadratic function representing the model curve. With such normalization, it is possible to simplify the calculation and perform the calibration with higher accuracy because a number of the items of the stored data can be used.

The reliability evaluating part can evaluate the presence or absence of the reliability of the correction value based on the number of the items of the data stored in the data storing part. This is because if the number of the items of the data increases, the number of the points plotted in extracting the model curve increases, the accuracy of the model curve increases, the accuracy of the parallax offset obtained by Hough transform from the model curve increases, and the reliability of the correction value increases correspondingly.

Figure 10:
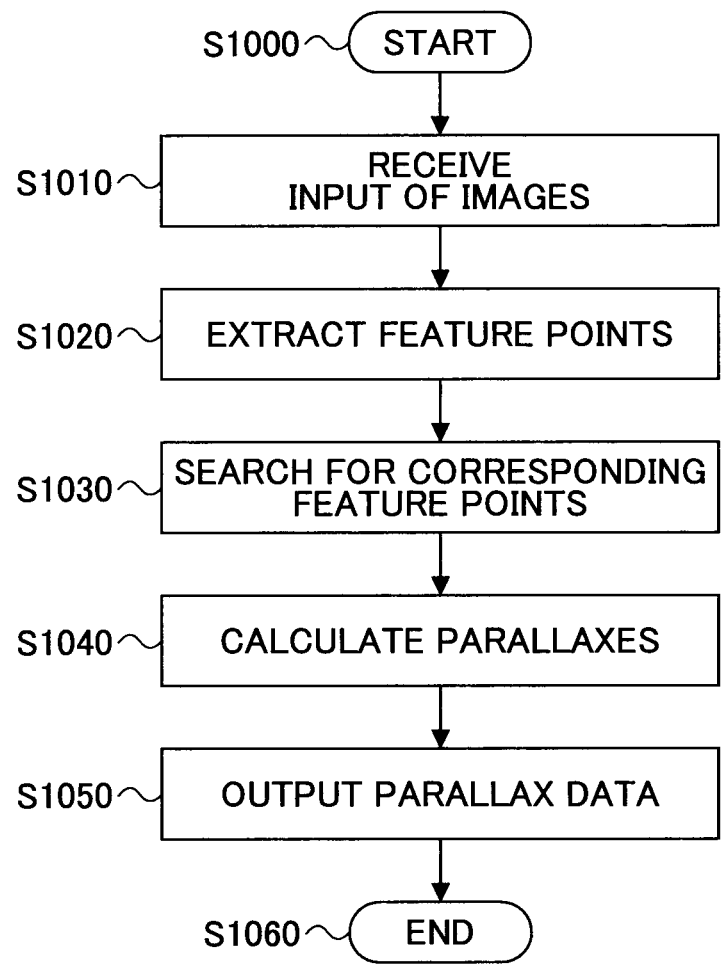
FIG. 10 is a flowchart for illustrating a flow of a parallax data generating process.

Next, the process performed in the distance calculation device 30 is described in detail. FIG. 10 is a flowchart for illustrating a flow of a parallax data generating process executed by the parallax data generating part 110. The process routine starts at step 1000. In step 1010, the images captured simultaneously by these two imaging devices 20, 21 disposed in parallel are received. Next, the feature points are searched for in the images. At first, in step 1020, the feature points whose changes in the brightness are great are extracted from one of the images (i.e., the reference image). Next, in step 1030, the positions of the feature points of the same subjects as areas (blocks) near the corresponding feature points in the reference image are searched for in another image (i.e., the corresponding image). The search of the corresponding feature points can be implemented by using know techniques such as SAD (Sum of Absolute Difference), POC (Phase-Only Correlation), etc.

According to SAD, in order to evaluate the similarity between images, an area is clipped from the image to be compared; sum of the brightness difference with respect to the clipped area is determined; and the clipped area which gives the minimum value is searched for, which enables to determine the changes between the images on a pixel basis. According to POC, in order to determine the correlation (i.e., the similarity) between the image as a reference and the image to be compared, the digitized image is processed mathematically by Fourier transform to be divided into amplitude information (shades of gray data) and phase information (edge data of the image); and the correlation is instantaneously image-processed using only the phase information.

After the feature points have been searched for, in step 1040, the parallaxes are calculated. The parallax can be calculated as the distance obtained by taking the differential between the positions of the corresponding feature points in these two images obtained by the feature point searching. Further, the parallax offset correction is performed by subtracting the parallax offset input from the parallax offset detecting part 120. This corrects the displacement by the parallax offset calculated at the previous calculation. It is noted that until the result of the parallax offset detection process is output, 0 is used as an initial value because there is no parallax offset available for the correction value.

When the parallaxes are calculated, in step 1050, the parallax data is output. In other words, a parallax image which has pixel values of the corrected parallax amounts can be output as the parallax data. After the output, in step 1060, this process routine ends. It is possible to continue to output the parallax data related to the scene in front of the imaging devices 20, 21 at all times by executing this process routine repeatedly at regular time intervals.

Figure 11:
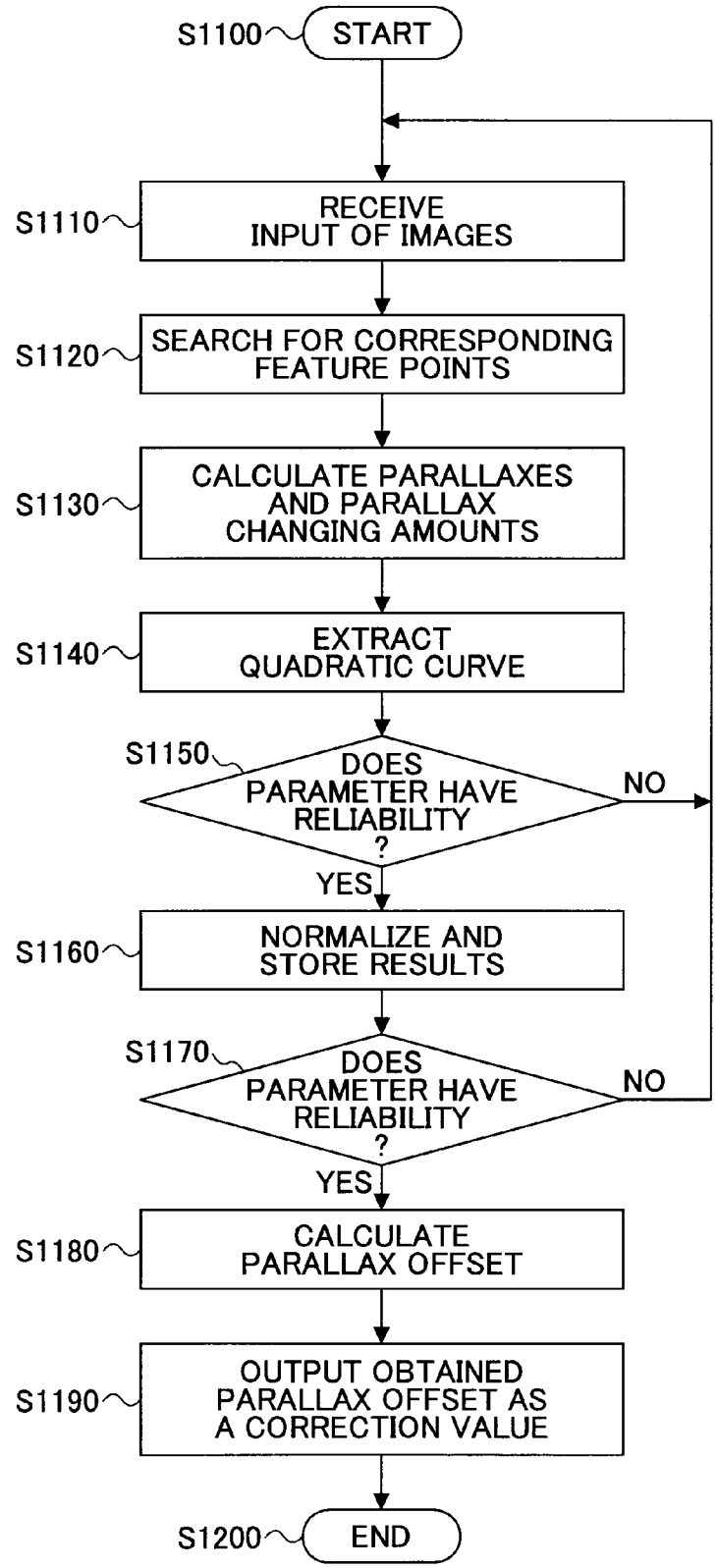
FIG. 11 is a flowchart for illustrating a flow of a correction value calculating process.

The parallax offset detecting part 120 utilizes the parallax data input from the parallax data generating part 110 to calculate the parallax offset as the correction value for correcting the parameter related to the positions of the imaging devices 20, 21. Since the parallax offset detection process depends on the change in temperature, etc., it is performed repeatedly at regular time intervals during the operation of the distance measurement system. FIG. 11 is a flowchart for illustrating a flow of a parallax offset detecting process executed by the parallax offset detecting part 120.

This process routine starts at step 1110 in which the images are received. The images received include two reference images from the imaging control part 100 and the parallax data from the parallax data generating part 110, that is to say, two parallax images corresponding to the reference images.

Next, in step 1120, the feature points which correspond to each other between two reference images are searched for. As is the case with the feature point searching by the parallax data generating part 110, SADs are calculated on a block basis to search for the position which gives the minimum value. However, in contrast to the feature point searching of the image in FIG. 10, a radial search range is set. By setting such a search range, it is possible to reduce the calculation amount for the search process of the feature points and remove the object moving in a lateral direction or rotations of the host vehicle to some extent.

In step 1130, for each of the feature points, the representative parallax is calculated based on the corresponding two parallaxes using the formula 5, and the parallax changing amount is calculated using the formula 6. Then, in step 1140, the quadratic curve such as expressed by the formula 9 is extracted by Hough transform applied to the calculated parallaxes and the parallax changing amounts. Specifically, a two dimensional plane defined by parameters a and $p_{off}$ (replaced with b, hereinafter) is divided into a number of areas by a predetermined spacing within a predetermined range, and a two dimensional array corresponding to the respective areas is prepared in a memory.

The equation $p'=a(p-b)^2$ is assumed as a curve in a-b space. The respective measured p and p' are plotted on the curve $b=p+\sqrt{(p'/a)}$ in the two dimensional array representing the a-b space. When all the measured p and p' are plotted, a pair of a and b, which corresponds to an area in which the number of the plotted p and p' is maximum, can be considered to express a curve passing thorough a number of the measured values p and p'. Thus, the pair of a and b can be selected as the model curve. The parameter b obtained here is the parallax offset which can be used for the parallax correction process.

Then, in step 1150, the reliability of the obtained parameters is evaluated. For example, the following two evaluation criteria can be used. One is the dispersion of the parallax differentials. Only the data points within a predetermined range which is defined in an up-and-down direction with respect to the model curve, among the feature point data plotted in the p-p' space, are extracted. Then, for the extracted data, the average root-mean-square E of the differentials between the measurements and the approximated model is calculated, and it is determined whether E is within a predetermined threshold, that is to say, $p'_{tol}$ in the case of FIG. 9 is smaller than or equal to 0.3 pixels, for example. If $p'_{tol}$ is smaller than or equal to 0.3 pixels, it is determined that there is reliability.

Another criterion is related to the distribution of the distance ranges. As shown in FIG. 8, ranges of the parallax are defined, and if more than 20 percent of the data points in all the measurement data exist in the parallax region indicated by 0 (for example, smaller than or equal to 5 pixels) and the parallax region indicated by 1 (for example, greater than or equal to 10 pixels), respectively, it is determined that there is reliability.

In this way, the reliability of the extracted model parameters is determined from two viewpoints. Only if it is determined by both of these two viewpoints that there is reliability, the process routine goes to step 1160. On the other hand, if it is determined that there is not reliability, the measurement data is discarded, and the process routine returns to step 1110 to receive the input of the next images.

In step 1160, a number of the items of the measurement data are accumulated so as to improve accuracy. Specifically, the item p' of measurement data, which is extracted as data near the model curve in step 1150 of the reliability evaluation, is divided by the obtained model parameter a using the formula 10, and the resultant $p'_{nor}$ is stored together with the original p as a pair.

In step 1170, simply, if the number of the items of the accumulated data exceeds a certain threshold, it is determined that the reliability is high, and the process routine goes to the next step 1180. On the other hand, if the number does not exceed the threshold, the process routine returns to step 1110 to receive the input of the images while storing the data. Although merely the number of the accumulated data items is determined in this example, it is also possible to determine by applying two evaluation criteria as is the case with step 1150.

In step 1180, a model fitting can be performed using a least squares approximation. This is because a function for removal of the outliers such as Hough transform is not necessary since the feature points related to the mobile objects have already been removed, and it is not possible to obtain discrete parameters if the Hough transform is used.

The least squares approximation is performed for the accumulated data using the formula 9. However, the parameter a is fixed to 1 because the data has already been normalized. Thus, the optimization is performed with respect to the parameter $p_{off}$ only. As a result of this, the parallax offset is estimated based on the number of the captured images. Then, for the subsequent process, at the end of this step, the accumulated data items of pairs of p and p' are deleted.

In step 1190, the parallax offset $p_{off}$ thus obtained is output to the parallax data generating part 110, and in step 1200 the process routine ends. The output parallax offset is utilized for the parallax offset correction performed in generating the parallax data in the parallax data generating part 110.

With this arrangement, since the parallax offset is calculated to be constantly output to the parallax data generating part 110, the camera parameter can be calibrated constantly and thus high accuracy of the distance measurement can be maintained.

As described above, since the parallaxes and the parallax changing amounts are calculated and the parallax offset can be calculated based on these items of the data independently from the distance between the locations at the time of imaging, it is possible to detect the parallax offset with stability utilizing the various images captured during operations without relying on a sensor for measuring the own position such as a vehicle speed sensor or the like other than a camera and without assuming the existence of the subject with a particular shape.

Further, a condition which leads to a detrimental effect in calculating is detected from the image itself without relying on the external sensor other than the imaging devices 20, 21. Thus, the applicability is high and the calibration can be implemented with high accuracy.

Further, since a number of the frames are utilized, a calibration apparatus with higher accuracy can be implemented. Further, since the correction value is calculated from the camera image itself, the applicability is high and the calibration system with high accuracy can be implemented.

The present invention is disclosed with reference to the preferred embodiments. However, it should be understood that the present invention is not limited to the above-described embodiments, and other embodiments, variations thereof, addition and elimination may be made within the scope contemplated by those skilled in the art. Thus, the present invention can provide, in addition to the calibration apparatus and the calibration method described above, a computer readable program for executing the method and a recording medium on which the program is recorded.

The present application is based on Japanese Priority Application No. 2010-204328, filed on Sep. 13, 2010, the entire contents of which are hereby incorporated by reference.

The invention claimed is:

1. A calibration apparatus for calibrating a parameter related to positions of first and second imaging devices, the parameter being set in a distance measurement system which is installed in a mobile object and performs distance measurement with the imaging devices, the calibration apparatus comprising:

a processing circuit, to receive inputs of two reference images and plural items of parallax data, the two reference images being captured by the first imaging device at two locations, and the parallax data being calculated using the two reference images and two corresponding images based on positions of plural feature points common to the reference image and the corresponding image for each pair thereof on a location basis, the two corresponding images being captured by the second imaging device at the two locations;

search for the plural feature points common to the two reference images;

calculate parallaxes and parallax changing amounts thereof, based on the parallax data related to the respective feature points in the two reference images, for each of the searched for feature points;

create a model curve using the calculated parallaxes and parallax changing amounts thereof, the model curve being a quadratic curve that expresses a relation between the parallaxes and the parallax changing amounts, wherein the model curve is the quadratic curve in a coordinate system in which a lateral axis is represented by one of the parallaxes and the parallax changing amounts, and a longitudinal axis is represented by the other of the parallaxes and the parallax changing amounts;

normalize the parallax changing amounts if the parallax data is evaluated to be reliable;

store the normalized parallax changing amounts, wherein the normalized parallax changing amounts are associated with the corresponding parallaxes;

determine if the stored normalized parallax changing amounts and the corresponding parallaxes are reliable if a number of the stored normalized parallax changing amounts is greater than a predetermined value; and calculate a correction value for the parameter related to the positions of the imaging devices as a parallax offset by an intercept of the model curve.

2. The calibration apparatus claimed in claim 1, wherein the model curve is the quadratic curve with which a displacement in parallax direction is calculated as the correction value.

3. The calibration apparatus claimed in claim 1, wherein the processing circuit evaluates the presence or absence of reliability of the correction value based on a distribution of the parallaxes and dispersion of the parallax changing amounts with respect to the model curve.

4. The calibration apparatus claimed in claim 3, wherein the processing circuit evaluates the presence or the absence of reliability of the parallax data by
extracting only the data of the parallax changing amounts which are within a predetermined range from the parallax changing amounts on the model curve;
calculating an average root-mean-square of differentials between the parallax changing amounts of the extracted data and the parallax changing amounts for the corresponding parallaxes on the model curve; and
determining whether the calculated average root-mean-square is smaller than or equal to a threshold.

5. The calibration apparatus claimed in claim 3, wherein the processing circuit evaluates the presence or the absence of reliability of the parallax data by calculating a proportion of a number of the parallaxes included in a specified parallax range and determining whether the calculated proportion is greater than or equal to a predetermined proportion.

6. The calibration apparatus claimed in claim 1, wherein the processing circuit calculates the normalized parallax changing amount by dividing the parallax changing amount by a proportional factor of a quadratic function representing the model curve.

7. A distance measurement system comprising:
a calibration apparatus claimed in claim 1; and
first and second imaging devices with the same focal length, the imaging devices being spaced apart and disposed wherein respective imaging planes are on a same straight line,
wherein the processing circuit calculates and outputs plural items of parallax data, the parallax data being calculated using the two reference images and two corresponding images based on positions of plural feature points common to the reference image and the corresponding image for each pair thereof on a location basis, the two corresponding images being captured by the second imaging device at the two locations.

8. The distance measurement system claimed in claim 7, wherein the processing circuit obtains the correction value from the calibration apparatus, perform the correction for the plural items of parallax data using the correction value, and outputs the corrected parallax data to the calibration apparatus.

9. A calibration method for calibrating a parameter related to positions of first and second imaging devices, the parameter being set in a distance measurement system which is installed in a mobile object and performs distance measurement with the imaging devices, the calibration method comprising:

receiving inputs of two reference images and plural items of parallax data, the two reference images being captured by the first imaging device at two locations, and the parallax data being calculated using the two reference images and two corresponding images based on positions of plural feature points common to the reference image and the corresponding image for each pair thereof on a location basis, the two corresponding images being captured by the second imaging device at the two locations;

searching for the plural feature points common to the two reference images;

calculating, using a processing circuit, parallaxes and parallax changing amounts thereof, based on the parallax data related to the respective feature points in these two reference images, for each of the searched for feature points;

creating a model curve using the calculated parallaxes and parallax changing amounts thereof, the model curve being a quadratic curve that expresses a relation between the parallaxes and the parallax changing amounts, wherein the model curve is the quadratic curve in a coordinate system in which a lateral axis is represented by one of the parallaxes and the parallax changing amounts, and a longitudinal axis is represented by the other of the parallaxes and the parallax changing amounts;

normalizing the parallax changing amounts if the parallax data is evaluated to be reliable;

storing the normalized parallax changing amounts wherein the normalized parallax changing amounts are associated with the corresponding parallaxes;

determining if the stored normalized parallax changing amounts and the corresponding parallaxes are reliable if a number of the stored normalized parallax changing amounts is greater than a predetermined value; and calculating, using the processing circuit, a correction value for the parameter related to the positions of the imaging devices as a parallax offset by an intercept of the model curve.

10. The calibration method claimed in claim 9, wherein the model curve is a quadratic curve with which a displacement in a parallax direction is calculated as the correction value.

11. The calibration method claimed in claim 9, further comprising a step of evaluating the presence or absence of reliability of the correction value based on a distribution of the parallaxes and dispersion of the parallax changing amounts with respect to the model curve.

12. The calibration method claimed in claim 11, wherein the step of reliability evaluating includes
extracting only the data of the parallax changing amounts which are within a predetermined range from the parallax changing amounts on the model curve;
calculating an average root-mean-square of differentials between the parallax changing amounts of the extracted data and the parallax changing amounts for the corresponding parallaxes on the model curve; and determining whether the calculated average root-mean-square is smaller than or equal to a threshold.

13. The calibration method claimed in claim 11, wherein the reliability evaluating includes calculating a proportion of a number of the parallaxes included in a specified parallax range and determining whether the calculated proportion is greater than or equal to a predetermined proportion.

14. The calibration method claimed in claim 9, wherein the step of normalizing includes calculating the normalized parallax changing amount by dividing the parallax changing amount by a proportional factor of a quadratic function representing the model curve.

15. The calibration method claimed in claim 11, wherein the step of evaluating includes evaluating the reliability of the correction value based on a number of data items stored in a memory, the memory storing the parallax changing amounts, wherein the parallax changing amounts are associated with the corresponding parallaxes.

* * * * *